Aug. 21, 1973     HEINZ-RÜDIGER VOLLBRECHT     3,754,075
TEMPERATURE REGULATING PROCESS FOR VIBRATORY GRATE REACTORS
Filed Jan. 18, 1971                                2 Sheets-Sheet 2

BY Cushman, Darby & Cushman
ATTORNEYS

United States Patent Office 3,754,075
Patented Aug. 21, 1973

3,754,075
TEMPERATURE REGULATING PROCESS FOR VIBRATORY GRATE REACTORS
Heinz-Rüdiger Vollbrecht, Rheinfelden, Baden, Germany, assignor to Deutsche Gold- und Silber-Scheideanstalt vormals Roessler, Frankfurt am Main, Germany
Filed Jan. 18, 1971, Ser. No. 106,978
Claims priority, application Germany, Jan. 23, 1970, P 20 02 904.3
Int. Cl. C01b 33/08
U.S. Cl. 423—343
9 Claims

ABSTRACT OF THE DISCLOSURE

There is provided a process for the regulation of a vibratory grate in reacting silicon or silicon containing materials with hydrogen halides by controlling the periods of vibration and pause so that a preselected maximum temperature is not exceeded.

---

Figure 1:
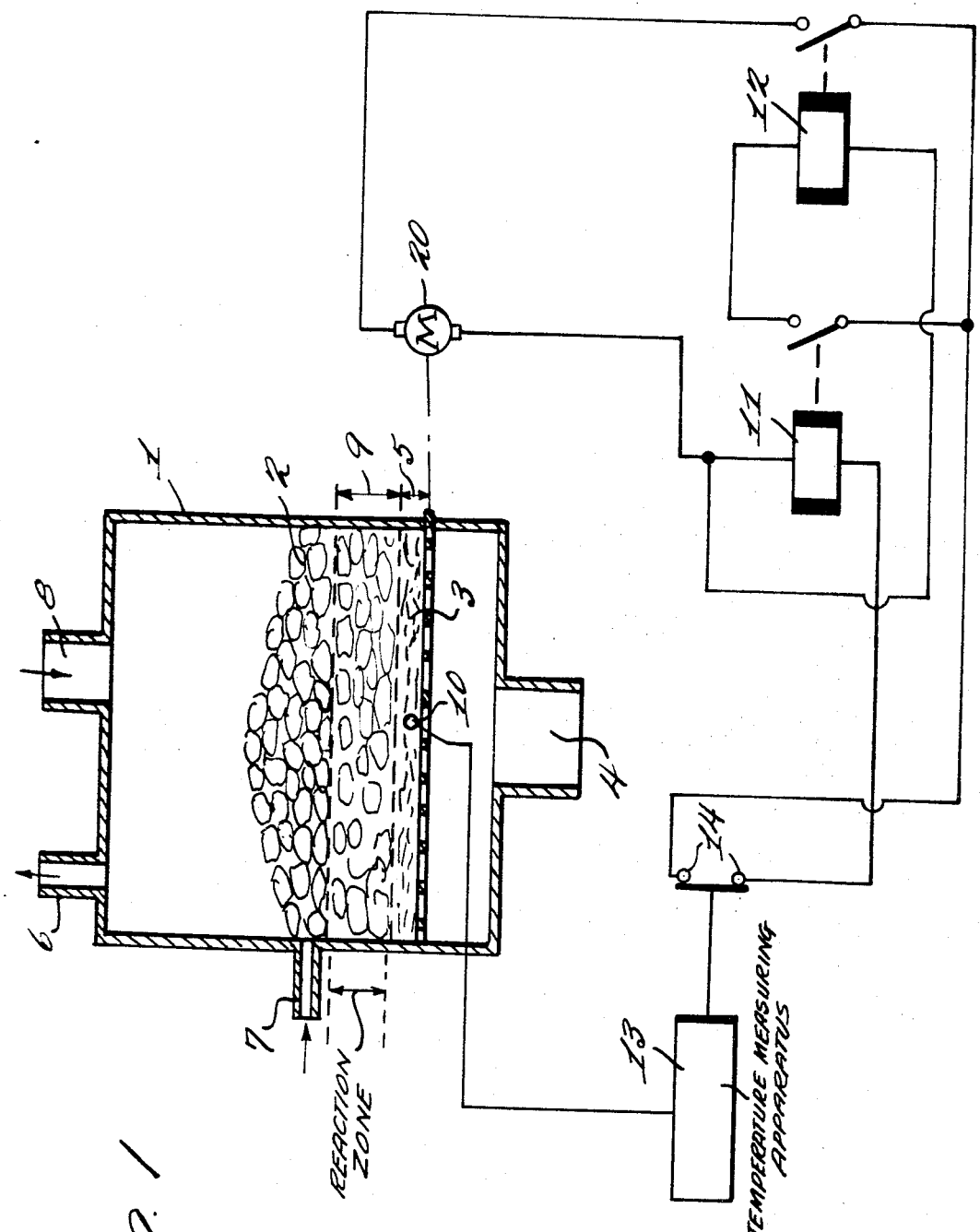

The invention is concerned with a process for the regulation, preferably for limitation of the upper temperature, of a vibrating iron grate of a reactor for the continuous reaction of lumpy silicon or silicon containing materials, e.g. ferrosilicon, with a hydrogen halide, preferably hydrogen chloride, although there can be used hydrogen bromide, hydrogen iodide, or hydrogen fluoride.

Silicon halides, $SiX_4$, e.g. silicon tetrachloride, silicon tetrabromide, silicon tetraiodide, silicon tetrafluoride and halosilanes $SiH_nX_{4-n}$, where $n$ is an integer of 1 to 3, e.g. silicochloroform, silicobromoform, silicofluoroform, silicoiodoform, dichlorosilane, dibromosilane, monochlorosilane, monobromosilane are important starting materials for the production of silicon organo electronic grade silicon compounds, pyrogenic silica, water repellant agents, etc. They can be produced by reaction of silicon or silicon alloys with hydrogen halides at temperatures above 280° C., e.g. at temperatures up to about 400° C., with the formation of hydrogen as an additional reaction product.

According to a known process the required silicon tetrachloride for the production of pyrogenic silica was produced by the reaction of 89 to 91% silicon containing ferrosilicon with hydrogen chloride at temperatures of about 800 to 1200° C. The reaction can be carried out continuously, for example, by charging from above with ferrosilicon lumps a cylindrical reactor provided in its lower part with an iron vibratory grate, leading hydrogen chloride from below through the FeSi charge on the grate while discharging the ash formed in the exothermic halogenation reaction by vibrating the grate and drawing off the volatile halogenation product from the upper section of the reactor.

After the start of the operation of the reactor a layer of ashes forms over the iron rods of the vibratory grate. Above the ashes is a hot reaction zone of about 1100° C. In the customary process the ashes were discharged periodically at the end of a fixed interval of time by operating the vibratory grate for a fixed interval of time. It frequently occurred that so much ashes and charge were discharged that the hot reaction zone came near the iron grate. This resulted in the grate becoming almost unusable in a short period of time because of the corrosive action of the hydrogen chloride at the elevated temperature.

In such cases the return of larger amounts of, in a given case, cooled, discharge gases from the reaction with admixture with the hydrogen chloride, proved to be the only means for reducing the temperature near the grate and for again shifting the reaction zone upwardly. This mode of action, to be sure, is opposed to an economical operation since considerable amounts of gases must be recirculated. Moreover, it includes the danger that the reaction zone migrates too far upwardly, whereby the lower part of the charge is removed from the reaction with the gaseous reaction partner and blocks the grate.

There exists, therefore, a need for a process which permits the maintenance of an adequate temperature gradient inside a layer of ashes of limited thickness to protect the grate while permitting the continuous reaction connected with periodic discharge of ashes.

Surprisingly, it has now been found that a disturbance free operation of a vibratory grate reactor can be obtained by continuously reacting silicon or ferrosilicon with a hydrogen halide in a reactor having a vibrating grate and wherein an ash layer is formed on the grate comprising the steps of:

Establishing a continuous fixed vibrating and pause system wherein (a) vibration of the grate is carried out for a fixed period of time followed by
(b) a pause in vibration of the grate for a fixed period of time,
(c) measuring the temperature in the ash layer on the grate during the reaction,
(d) interrupting said continuous fixed vibrating and pause system whenever said measured temperature exceeds a predetermined value and maintaining a pause in vibration until said measured temperature is again below said predetermined value, and
(e) repeating steps (a), (b), (c) and (d).

The temperature occurring in the ash layer above the grate and in its vicinity is measured in an appropriate embodiment of the invention by means of a thermocouple in a thermal protective tube led from below through, and above the grate. In this connection it has proved advantageous to measure the ash temperature about 5 to 150 mm., preferably, about 10 to 50 mm. above the grate.

The predetermined temperature which when exceeded, causes an interruption in vibration until the temperature is again lowered will depend, inter alia, on the hydrogen halide used. In the reaction of silicon with hydrogen chloride in which there is preferably formed silicon tetrachloride, it has proven suitable to provide the interruption of the vibrations, or the introduction of the pauses in vibration, at a temperature in the range of 200 to 600° C., preferably 350 to 500° C.

According to an especially suitable further made for the practice of the invention the temperature is measured in a plane parallel to the grate in several places, e.g., 2, 3, 4, 5, 6 or 10 places, and the interruption of the vibrations or the introduction of the pauses in vibrations is controlled by the highest temperature measured.

The regulatory process of the invention accordingly provides in detail the following combined features: there are predetermined a pause interval of constant duration and a fixed, limited vibrating time. During the pause interval the thickness of the ash layer grows depending on how the reaction proceeds, while the reaction zone correspondingly shifts upwardly. The interval is chosen preferably so that the ash overlayer, at most, becomes 100 mm. thick. For the subsequent vibrating a maximum duration is suggested which, however, can be shortened depending upon reaching a predetermined value for the temperature existing above the grate in the vicinity thereof. After expiration of the maximum vibration period, or in most cases, after reaching the predetermined value of the temperature of the grate (preferably about 370° C., but which can be 200 to 600° C.), the vibrating mechanism is turned off.

In order to measure the temperature there is used a thermocouple which is enclosed by a thermoprotective tube of iron, nickel, or Hastelloy B. A thermoprotective tube of iron has proven especially suitable since this becomes immediately destroyed by a sudden breaking through of the reaction layer to the grate and thereby furnishes an additional warning before corrosion of the grate begins.

The probe of the measuring probe is pushed through from below between the grate bars so that it projects a little beyond the upper surface of the grate, for example, 40 mm., and is therefore always inside the ash layer.

In practice it has proven suitable to arrange thermoprobes in several places in the vibrating grate, especially also, on its outer edges, since the temperatures in the ash layer on the grate can vary. Thus, often there are observed greater temperature differences near the edges of the grate while the temperatures in the middle region of the grate are largely the same.

For best results the temperature on the grate is guided so that it does not exceed 370° C. in any of the measuring places. This is attained by regulating the driving motor of the vibrating grate by the highest temperature measured.

After the end of the vibrations the measured temperature value on the grate increases, first, somewhat beyond the predetermined temperature, then, however, it falls below this. As soon as the temperature falls below the predetermined regulatory temperature, the pause intervals of constant duration again commence and thus the cycle is finished.

The regulation according to the invention makes possible, and until now unreachable, uniformity in carrying out the process and considerably increases the process economy by eliminating energy consuming cooling precautions as well as shut down pauses and grate repair.

The process provides that at essentially constant grate temperature practically as much ash is shaken off as subsequently is formed in the reaction during the vibratory free intervals which follow the vibratory intervals. As ash, there continually results only fine-grained ash. Sieving to separate unreacted ferrosilicon out of an only partially consumed charge and returning the ferrosilicon remaining as sieve residue into the reactor, as was the rule in customary processes is eliminated.

Unless otherwise stated all parts and percentages are by weight.

The invention will be further explained in the examples and accompanying drawings.

Figure 2:
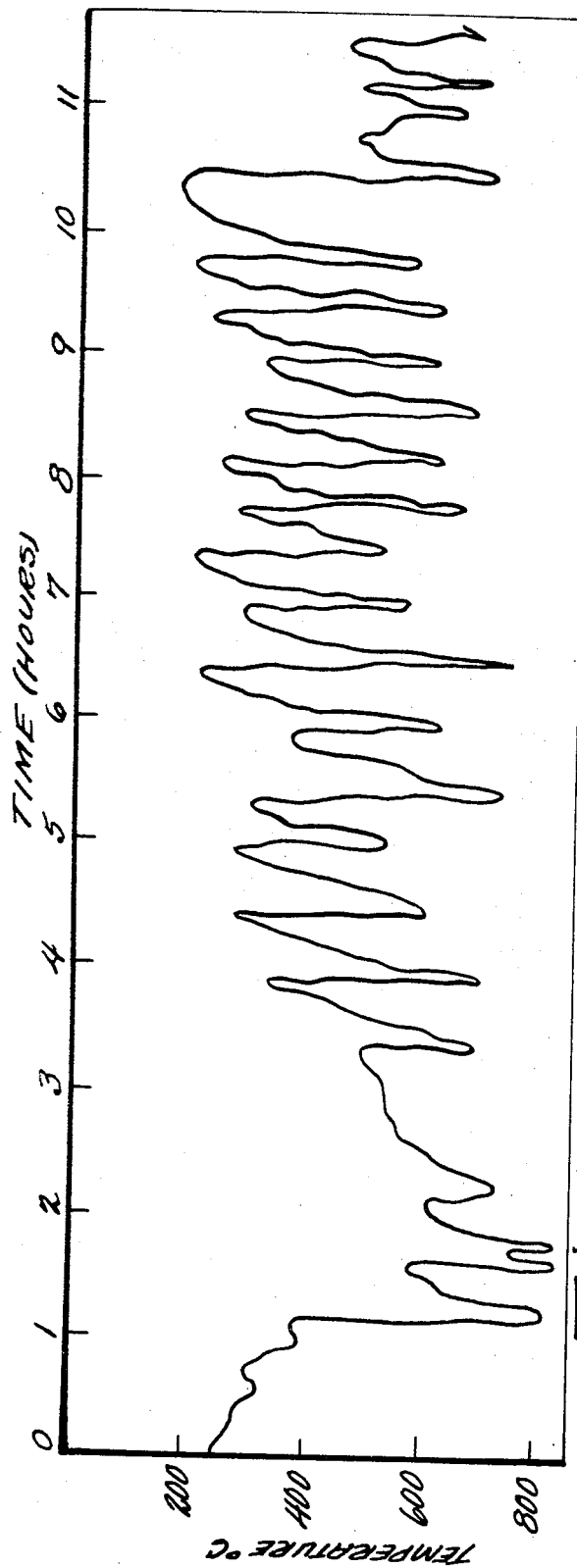
Figure 3:
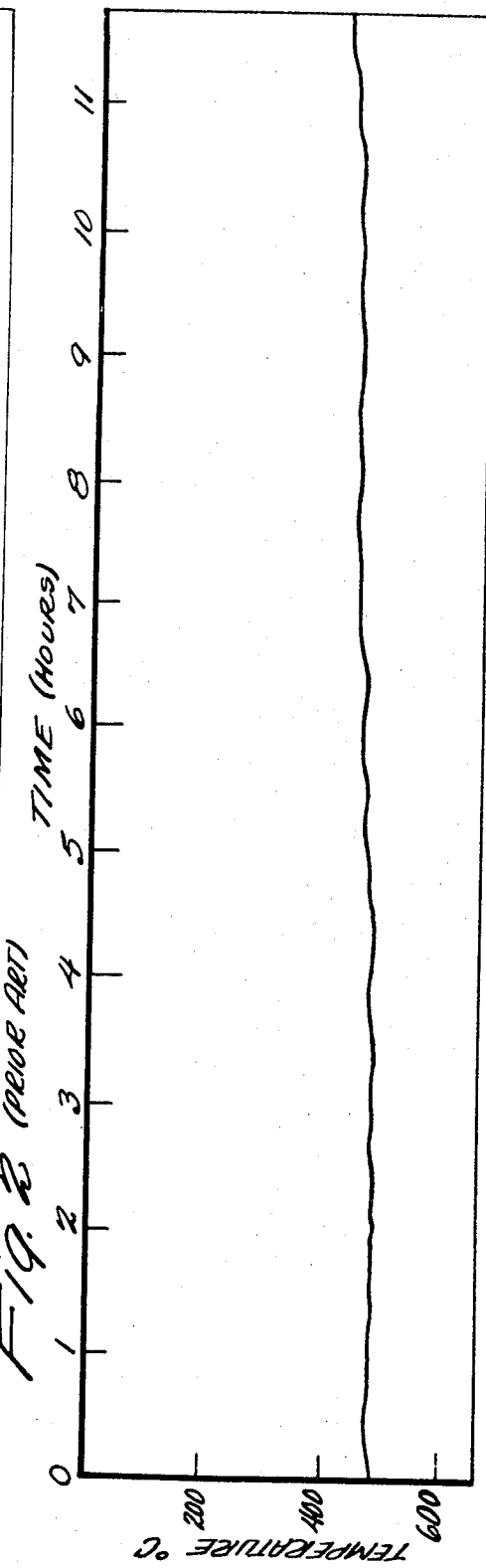

In the drawings, FIG. 1 is a schematic diagram of a suitable apparatus and control arrangement for carrying out the process of the invention;

FIG. 2 is the record of the time dependent temperature progress on the grate by a known process using fixed vibration and pause times; and FIG. 3 is the record of the time dependent temperature progress on the grate using the regulation of the invention.

In FIGS. 2 and 3 the times are in hours.

EXAMPLE

Referring to FIG. 1, in a reactor 1, which was about 2.5 meters high and about 1 meter in diameter, there was placed a charge 2 of lumps of ferrosilicon containing 89 to 91% silicon which rested upon a vibratory grate 3, actuated from outside by known means, such as motor 20. The ferrosilicon reacted with hydrogen chloride which entered the reactor at 4 and was led upwardly through the grate. About 420 kilograms per hour of hydrogen chloride were employed. In the reaction zone 5, there occurred a temperature of up to 1150° C. To carry off the heat of a reaction there was used the gaseous reaction product (primarily silicon tetrachloride and hydrogen) which passed out of the reactor at 6, and which was blown in from the side immediately above the reaction zone in the furnace at 7. In regular rotation so much FeSi (about 90 kilograms per hour) was fed into the reactor at 8 that the content of FeSi in the reactor remained nearly constant during the operation. To protect the vibratory grate against corrosive attack by hydrogen chloride at high temperatures (from about 480 to 500° C.) an ash layer 9, of depleted FeSi, about 50 mm. thick was allowed to build up on the grate. The temperature measurement on the grate showed that immediately on the grate in the operation of the reactor temperatures prevailed of about 200 to 250° C., 30 mm. above the grate, about 350 to 400° C. and about 50 mm. above the grate, about 550 to 600° C. The fine, granulated falling ashes were continuously removed.

The temperature on the grate is measured by a main measuring probe 10, conducted from below, between the bars of the grate and ending 30 mm. above the upper surface of the grate the probe consisted of a thermocouple enclosed in a thermoprotective tube made of iron. As the control value for this temperature, there was chosen 370° C. As the pause intervals, 30 minutes was preselected on time relay 11, as maximum vibrating time, 10 minutes on time relay 12. If the temperature measured with the main measuring probe 10 and indicated on the temperature measuring apparatus 13, does not exceed the 370° C. preselected, maximum temperature during the vibrating process then the preselected pause and vibration intervals take place. When the maximum temperature of 370° C. is exceeded the contact 14 opens, and the vibrating process is interrupted. After the temperature has fallen below the preselected maximum temperature, the contact 14 closes again and the pause interval takes place first before there again occurs the vibratory process.

A comparison of the advance produced according to the invention in comparison with the state of the art is facilitated by the temperature/time graphs in FIGS. 2 and 3.

During the customary process with predetermined fixed vibratory and pause time (according to FIG. 2 about 10 minutes vibration, 30 minutes pause) again and again the initially almost constant grate temperature suddenly rises far above the permitted limits and thereupon follows a strongly fluctuating temperature course. In contrast in the process of the invention (FIG. 3), the grate temperature remains practically unchanged.

What is claimed is:

1. An improved method of producing a silicon halide by continuously reacting silicon or ferrosilicon with a hydrogen halide in a reactor having a vibrating grate and wherein an ash layer is formed on the grate comprising the steps of:

establishing a continuous fixed vibrating and pause system wherein
 (a) vibration of the grate is carried out for a fixed period of time followed by
 (b) a pause in vibration of the grate for a fixed period of time,
 (c) measuring the temperature in the ash layer on the grate during the reaction,
 (d) interrupting said continuous fixed vibrating and pause system whenever said measured temperature exceeds a predetermined value and maintaining a pause in vibration until said measured temperature is again below said predetermined value, and
 (e) repeating steps (a), (b), (c) and (d).

2. A process according to claim 1 wherein the hydrogen halide is hydrogen chloride.

3. A process according to claim 2, wherein the charge is ferrosilicon.

4. A process according to claim 2 comprising measuring the temperature in the ash layer with a thermocouple.

5. A process according to claim 2 wherein the ash temperature is measured about 5 to 150 mm. above the grate.

6. A process according to claim 5 wherein the ash temperature is measured about 10 to 50 mm. above the grate.

7. A process according to claim 1 wherein the silicon or ferrosilicon is reacted with hydrogen chloride to form silicon tetrachloride and the pauses in vibration are commenced at a predetermined temperature in the range of 200 to 600° C.

8. A process according to claim 7 wherein the predetermined temperature is between 350 and 500° C.

9. A process according to claim 7 wherein the temperature is measured in a plurality of places in a plane parallel to the grate and the vibratory pauses are controlled by the highest temperature measured.

References Cited

UNITED STATES PATENTS

| | | | |
|---|---|---|---|
| 3,188,178 | 6/1965 | Arkless et al. | 23—205 |
| 2,856,273 | 10/1958 | Beber et al. | 23—288 S |
| 2,798,792 | 7/1957 | Stelling et al. | 23—205 |
| 2,869,991 | 1/1959 | Williams et al. | 23—2 S |

OSCAR R. VERTIZ, Primary Examiner

G. ALVARO, Assistant Examiner

U.S. Cl. X.R.

23—230 A